United States Patent
Cottard et al.

(10) Patent No.: US 8,311,290 B2
(45) Date of Patent: Nov. 13, 2012

(54) METHOD FOR IDENTIFYING A PERSON AND ACQUISITION DEVICE

(75) Inventors: Martin Cottard, Paris (FR); Joël-Yann Fourre, Paris (FR); François Rieul, Paris (FR)

(73) Assignee: Morpho, Paris (FR)

( * ) Notice: Subject to any disclaimer, the term of this patent is extended or adjusted under 35 U.S.C. 154(b) by 729 days.

(21) Appl. No.: 12/303,508

(22) PCT Filed: Jun. 5, 2007

(86) PCT No.: PCT/EP2007/004983
§ 371 (c)(1),
(2), (4) Date: Sep. 15, 2009

(87) PCT Pub. No.: WO2007/140988
PCT Pub. Date: Dec. 13, 2007

(65) Prior Publication Data
US 2010/0021016 A1    Jan. 28, 2010

(30) Foreign Application Priority Data
Jun. 6, 2006   (FR) ...................................... 06/04977

(51) Int. Cl.
*G06K 9/00*   (2006.01)
(52) U.S. Cl. ...................................................... 382/117
(58) Field of Classification Search .................. 382/100, 382/115–118; 351/200–204; 359/610, 643; 235/380–383; 340/5.1–5.92
See application file for complete search history.

(56) References Cited

U.S. PATENT DOCUMENTS
2006/0098097 A1   5/2006  Wach et al.

FOREIGN PATENT DOCUMENTS
WO   WO2004/090581 A2   10/2004

OTHER PUBLICATIONS

Dowski, E.R. et al.; "Wavefront Coding: A Modern Method of Achieving High Performance and/or Low Cost Imaging Systems", Proceedings of the SPIE; SPIE, Bellingham, VA, US; vol. 3779, Jul. 1999; pp. 137-145.

*Primary Examiner* — Atiba O Fitzpatrick
(74) *Attorney, Agent, or Firm* — Gerald E. Helget; Nelson R. Capes; Briggs and Morgan, P.A.

(57) ABSTRACT

A method for identifying a person (200) by capturing an image of the iris producing an anamorphic transformation of the image along a horizontal axis and then a vertical axis to code it in the form of one or two models. The model is compared with reference models stored in a database to determine the identity of the person. The acquisition device captures the image of the iris through means of optical deformation to produce the anamorphic transformation of the image and then codes the image into the models.

6 Claims, 3 Drawing Sheets

METHOD FOR IDENTIFYING A PERSON AND ACQUISITION DEVICE

The present invention concerns a device for acquiring the iris or irises of a person, and a method of identifying a person used with such an acquisition device. It finds an application in the field of biometric recognition and in particular in the field of identification by analysis of the irises of the eyes.

Identification by biometric recognition is used for protecting installations such as for example buildings or machines or for obtaining the granting of rights, such as for example the issuing of an identity card, the payment of a pension, etc. This technology makes it possible to dispense with access codes or cards, which may stolen or falsified. The use of this technology reinforces security in so far as the probability that two persons having two identical biometrics is almost zero.

A first method of identifying a person by analysing his iris is known, which is based on the transformation of the image into a model and on the comparison of this model with reference models stored in a database. The model issuing from the transformation is generated by an algorithm from the image of the iris and contains a set of information characteristic of the image of the iris. As with iris images, these models are unique for each person.

The first identification method begins with a step of capturing an image of the iris using an image-taking sensor. The first identification method then continues with a step of transforming the image thus captured into a model, and then a step of comparing the model with the reference models in the database, and, finally, by a decision-taking step concerning the identity of the person from the result of the comparison step.

A second identification method is also known, designed to analyse the irises of the two eyes from a capture of an image of each iris. For this purpose, either the image-taking sensor used for the second identification method is twice as large as that used for the first identification method, or two image-taking sensors similar to the one used for the first identification method are used for the second identification method.

The first identification method has another disadvantage, which lies in the useful surface of the captured image. This is because the captured image of the iris is generally divided into three zones. The first zone consists of the image of the top eyelid, the second zone consists of the image of the bottom eyelid and the third zone consists of the image of the central part of the eye, that is to say the iris proper. Only the third part can actually be used in the context of a method of identification by the iris. The use of an image-taking sensor allowing a sufficiently large capture of the third zone gives rise to an increase in the dimensions of the sensor and therefore its cost. In addition, an increase in the dimensions of the image sensor also gives rise to an increase, on the captured image, of the first zone and the second zone, which is unnecessary because these zones are not processed during the identification method. The dimensions of the image sensor are then unsuitable and the cost of the image sensor is high compared with the surface area of the captured image that is used during the identification method.

In the examples of the prior art described above, the cost of implementation of the first identification method or of the second identification method is high and increases when the captured useful surface increases.

An object of the present invention is to propose a device for acquiring the iris or irises of a person that does not have the drawbacks of the prior art.

For this purpose, an acquisition device is proposed comprising capture means designed to capture an image of the iris or irises of a person and being such that it comprises means of optical deformation between the capture means and the iris or irises that are designed to effect an anamorphosic transformation of the iris or irises before its capture.

Advantageously, the processing means are designed to make the captured image undergo an anamorphosic transformation that is the reverse of that generated by the optical deformation means prior to the transformation into one or two models.

According to a particular embodiment, the anamorphosic transformation takes place along a substantially horizontal first axis and along a substantially vertical second axis.

Advantageously, the coefficient of the anamorphosic transformation along the first axis is lower than the coefficient of the transformation along the second axis.

According to a particular embodiment, the acquisition device comprises:
  processing means designed to transform the said image into one or two models;
  storage means designed to store the reference models;
  comparison means designed to compare the said model with the reference models;
  decision-taking means designed to take a decision with regard to the identity of the person from information supplied by the comparison means.

The invention also proposes a method of identifying a person by an acquisition device according to one of the above variants comprising, when the person is facing the said acquisition device:
  a step of capturing an image of the iris or irises of the person through the optical deformation means;
  a step of processing the image thus captured so as to code it in the form of one or two models;
  a step of comparing the model or models thus obtained with reference models contained in storage means; and
  a decision-taking step concerning the identity of the person from the result of the comparison step.

Advantageously, during the processing step and prior to the coding of the image, the captured image is processed so as to reverse the effects of the deformation means.

The characteristics of the invention mentioned above, as well as others, will emerge more clearly from a reading of the following description of an example embodiment, the said description being given in relation to the accompanying drawings, among which:

FIG. 1 depicts an acquisition device according to the invention;

FIG. 2 depicts an algorithm of an identification method according to the invention;

FIG. 3 depicts the image of an iris captured by an acquisition device of the prior art;

FIG. 4 depicts the image of the same iris captured by an acquisition device according to the invention; and FIG. 5 depicts the image of an iris that has undergone a reverse anamorphosic transformation.

FIG. 1 depicts an acquisition device 150 disposed facing the eye 100 of a person whose iris 102 is to be identified. For this purpose, the acquisition device 150 comprises:
  control means 162;
  capture means 152;
  processing means 154;
  comparison means 158;
  decision-taking means 164;
  storage means 156; and
  upstream of the capture means 152, optical deformation means 160 are disposed.

The eye 100 comprises a top eyelid 104 and bottom eyelid 106. The area where the top eyelid 104 extends defines a first zone 108 and the area where the bottom eyelid 106 extends defines a second zone 112. The area where the iris 102 extends defines a third zone 110, which is therefore disposed between the first zone 108 and the second zone 112.

The capture means 152 may be of the CCD type and are designed to capture an image of the eye 100 and in particular the iris 102 or irises 102.

The optical deformation means 160 perform an anamorphosic transformation of the image of the eye 100 and therefore of the iris 102 before its capture.

The anamorphosic transformation performed by the optical deformation means 160 takes place along a first axis that passes substantially through the centres of the two irises 102 of the person, that is to say substantially horizontal, and along a second axis perpendicular to the first axis and which is situated in a substantially vertical plane.

The information contained in the irises is orthoradial information, that is to say the frames of the iris 102 are oriented on the radii of this iris 102.

FIG. 3 is an image 300 of an iris seen through acquisition device of the prior art. The lines 306 represent the frames of the iris that carry the information able to be used in the context of an identification by means of the iris. The circle 304 delimits the detection zone of the acquisition device, that is to say the zone inside the circle 304 is captured and analysed in order to verify the identity of the person. The capture means consist of a plurality of mini-sensors that each receive information coming from a substantially rectangular surface 302.

FIG. 4 is an image 400 of an iris seen through an acquisition device 150 according to the invention with a coefficient of the transformation along the first axis that is substantially ⅓. The lines 406 represent the frames of the iris that carry the information. The circle 304 delimits the detection zone of the acquisition device, which then contains a greater part of the iris 102 compared with the image in FIG. 3. The use of such a device thus makes it possible to take into account a larger surface of the iris 102 during the identification process described below even though, within each elementary surface 302, the image is deformed. There is then observed a reduction in the resolution along the first axis.

The reverse geometric transformation then consists of re-establishing the form of the iris 102. FIG. 5 is an image 500 of an iris that has undergone the said reverse geometric transformation. The image 500 is then broken down into four zones 502, 504, 506 and 508.

It will be noted that the two zones 502 and 504 that are situated at the lower and upper central part of the image 500 are degraded but this has no significant consequence during the identification process since these zones 502 and 504 are generally covered by the eyelids and cannot therefore be used in the context of a method of identification by iris.

It will be noted that the two zones 506 and 508 that are situated at the left and right lateral parts of the image 500 are very little degraded compared with the same image 500 captured in the case of a device of the prior art. Which makes it possible to have a good probability of identification during the identification process since these zones 506 and 508 are the zones where the information can most easily be used in the context of a method of identification by iris.

In the case of a capture of the image of an iris 102, this acquisition device 150 makes it possible to increase the useful zone corresponding to the iris 102 whilst keeping an image-taking sensor in accordance with that of the prior art or even reducing the dimension of the image-taking sensor. Thus the cost of implementation of the identification method that is described below is reduced or, at least, preserved, but the useful surface is then increased compared with that of the prior art.

In the case of a capture of the image of the two irises 102, this acquisition device 150 makes it possible to increase the capture zones so that the use of an imaging sensor allows the capture of the two irises 102, and this without the dimensions of the imaging sensor or the number of imaging sensor doubling. Thus the cost of implementation of the identification method that is described below is reduced compared with that of the prior art.

The optical deformation means 160 can take the form of optical lenses of the cylindrical lens or curved mirror type. In the case of a mirror, the image of the iris 102 or irises 102 is reflected in the mirror before being captured by the capture means 152.

The control means 162 control the capture means 152, the processing means 154, the comparison means 158, the decision taking means 164 and the storage means 156.

The processing means 154 effect a transformation of the image into a model in the case of the processing of the image of an iris 102, or into two models in the case of the processing of the image of two irises 102.

According to a particular embodiment, the processing means 154 are designed to make the captured image undergo a geometric transformation that is the reverse of that generated by the optical deformation means 160 prior to the transformation into one or two models. The image thus obtained is then in accordance with the image that it would have been possible to obtain with a larger acquisition device, and the model or models obtained then remain compatible with the databases already existing. The reverse geometric transformation is a reverse anamorphosic transformation. According to a particular embodiment, the reverse transformation is of the bilinear zoom type.

In the case where the person wishes to record the model or models thus obtained, during a recording phase, the model or models thus obtained are transferred to the storage means 156, where they constitute reference models. The storage means 156 then group together all the models of the persons who can be identified by one of the identification methods described below.

In the case where the person wishes to have his iris recognised, the model or models thus obtained are transmitted to the comparison means 158, which compare the model or models thus obtained with the reference models recorded in the storage means 156.

The storage means 156 can take the form of a database.

The comparison means 158 then transmit the results of the comparisons to the decision-taking means 164 which, depending on these results, determine whether or not the iris 102 is identified. The decision-taking means 164 are then designed to take a decision with regard to the identity of the person from information supplied by the comparison means 158.

Preferably, the control means 162, the processing means 154, the comparison means 158 and the decision-taking means 164 are collected together in a single calculation unit and are implemented by software.

FIG. 2 shows an algorithm of a method 200 of identifying a person by means of an acquisition device 150 adapted to capture the image of the iris 102 or irises 102 of a person. The identification method 200 thus comprises, when the person is facing the said acquisition device 150:

a step 202 of capturing an image of the iris 102 or irises 102 of the person through the optical deformation means 160;

a step 204 of processing the image thus captured so as to code it in the form of one or two models;

a step 206 of comparing the model or models thus obtained with reference models contained in storage means 156; and a decision-taking step 208 concerning the identity of the person from the result of the comparison step 206.

According to a particular embodiment, during the processing step 204 and prior to the coding of the image, the captured image is processed so as to reverse the effects of the deformation means 160.

The decision-taking step 208 can for example be based on analyses of similarity between the models to be identified and the reference models of the storage means 156. At each comparison, a score representing the similarity is given and, depending on whether the score is higher or lower than a reference value, the person is considered to be identified or not.

Preferably, the coefficient of the transformation along the first axis is lower than the coefficient of the transformation along the second axis.

As explained in FIGS. 3 to 5, in the case of orthoradial information, which is the case with the information contained in an iris, and horizontal masks (which is the case with the eyelids), vertical anamorphosis (that is to say with the coefficient of the transformation along the horizontal axis less than the coefficient of the transformation along the vertical axis) improves the global statistical efficiency at the time of acquisition, since the precision in the most often masked zones is reduced without losing too much information in the most usable zones.

Naturally the present invention is not limited to the examples and embodiments described and depicted but is capable of many variants accessible to persons skilled in the art.

What is claimed:

1. A method (200) of identifying a person implemented by using an acquisition device (150) and comprising:
   (a) a step (202) of capturing an image of the irises (102) of the person through optical deformation means (160) by the acquisition device (150) which effects an anamorphic transformation of the image of the irises (102) along a first axis that passes through the centers of the two irises (102) of the person and along a second axis perpendicular to the first axis;
   (b) a step (204) of processing the image thus captured so as to code it in the form of two models;
   (c) a step (206) of comparing the models thus obtained with reference models contained in storage means (156); and
   (d) a decision-taking step (208) concerning the identity of the person from the result of the comparison step (206).

2. The identification method (200) according to claim 1, wherein, during the processing step (204) and prior to the coding of the image, the captured image is processed so as to reverse the effects of the deformation means(160).

3. The acquisition device (150) for implementing an identification method according to claim 1 and comprising:
   (a) a capture means (152) designed to capture an image of the irises (102) of a person;
   (b) a processing means (154);
   (c) a storage means (156);
   (d) a comparison means (158);
   (e) a decision-taking means (164); and
   (f) a means (160) of optical deformation between the capture means (152) and the irises (102) that are designed to effect an anamorphic transformation of the image of the irises (102) before its capture, the anamorphic transformation taking place along a first axis that passes through the centers of the two irises (102) of the person and along a second axis perpendicular to the first axis.

4. The acquisition device (150) for implementing an identification method according to claim 2 and comprising:
   a. a capture means (152) designed to capture an image of the irises (102) of a person;
   b. a processing means (154);
   c. a storage means (156);
   d. a comparison means (158);
   e. a decision-taking means (164);
   f. a means (160) of optical deformation between the capture means (152) and the irises (102) that are designed to effect an anamorphic transformation of the image of the irises (102) before its capture, the anamorphic transformation taking place along a first axis that passes through the centers of the two irises (102) of the person and along a second axis perpendicular to the first axis; and
   g. the processing means (154) is designed to subject to the captured image an anamorphic transformation that is the reverse of that generated by the optical deformation means (160).

5. The acquisition device (150) according to claim 3, wherein the coefficient of the anamorphic transformation along the first axis is lower than the coefficient of the transformation along the second axis.

6. The acquisition device (150) according to claim 5, wherein the coefficient of the anamorphic transformation along the first axis is lower than the coefficient of the transformation along the second axis.

* * * * *

UNITED STATES PATENT AND TRADEMARK OFFICE
CERTIFICATE OF CORRECTION

| | | |
|---|---|---|
| PATENT NO. | : 8,311,290 B2 | Page 1 of 1 |
| APPLICATION NO. | : 12/303508 | |
| DATED | : November 13, 2012 | |
| INVENTOR(S) | : Martin Cottard et al. | |

It is certified that error appears in the above-identified patent and that said Letters Patent is hereby corrected as shown below:

At Column 1, before line 4, please insert the following:

--CROSS REFERENCE TO RELATED APPLICATIONS

The present application is based on and claims priority to International Application PCT/EP2007/004983 filed on June 5, 2007 and French Patent Application No. 06/04977 filed on June 6, 2006, the contents of which are hereby incorporated by reference in their entirety.

BACKGROUND OF THE INVENTION--

At column 1, line 14, replace "may stolen" with --may be stolen-- therewith.

At column 1, before line 63, please add the following:

SUMMARY OF THE INVENTION

At column 2, before line 42, please add the following:

BRIEF DESCRIPTION OF THE DRAWINGS

At column 2, before line 57, please add the following:

DETAILED DESCRIPTION OF THE ILLUSTRATIVE EMBODIMENT

Figure 1:
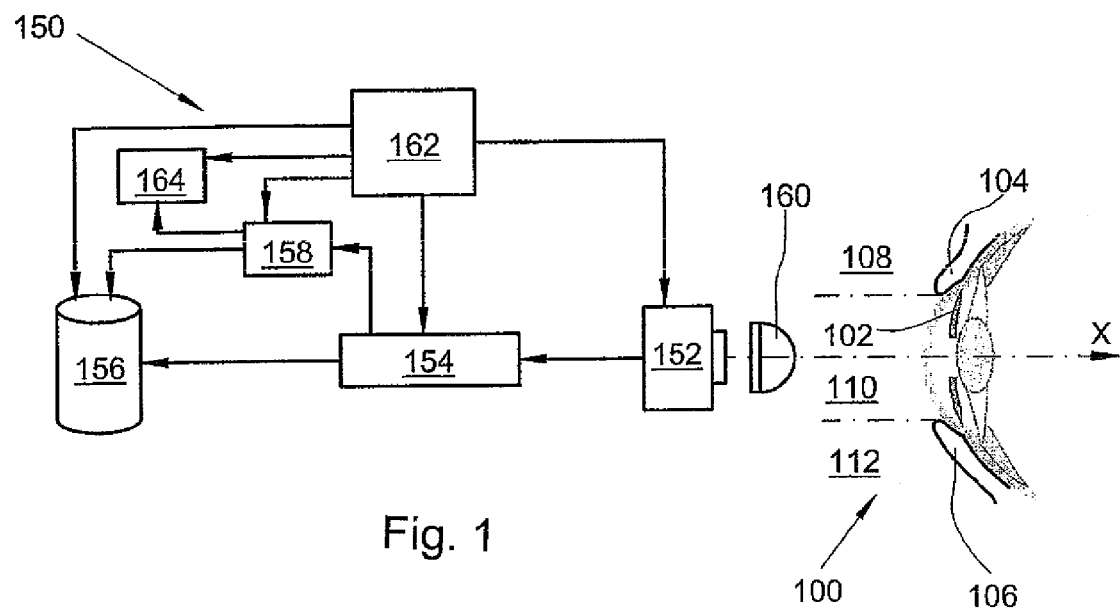
Figure 2:
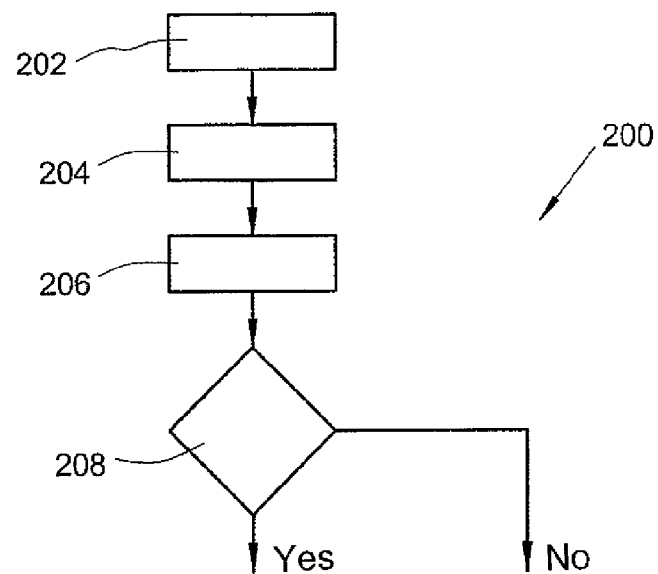
Figure 3:
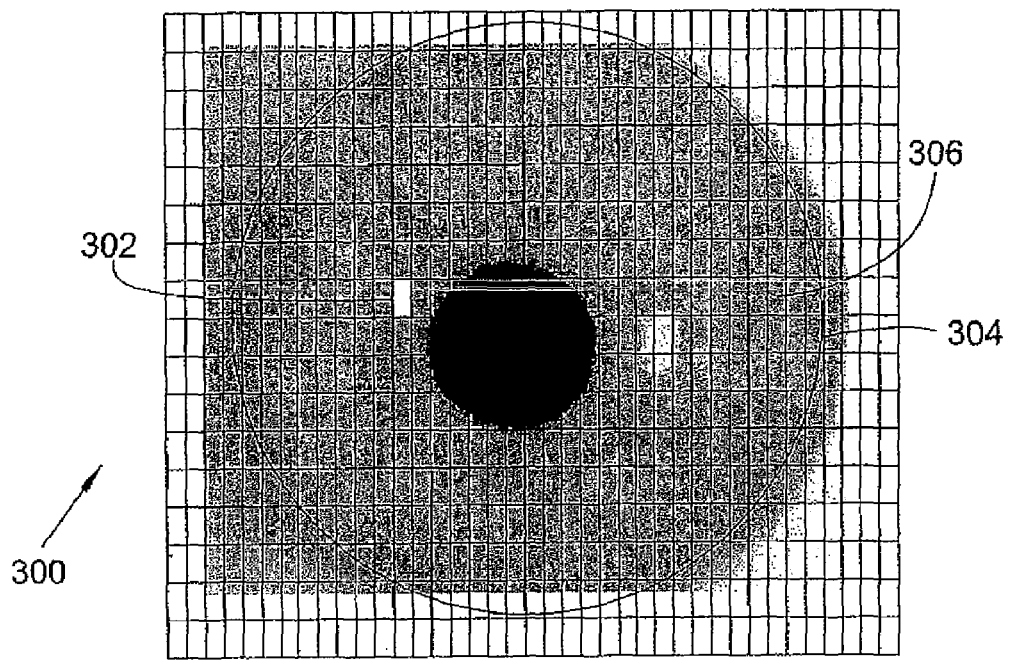
Figure 4:
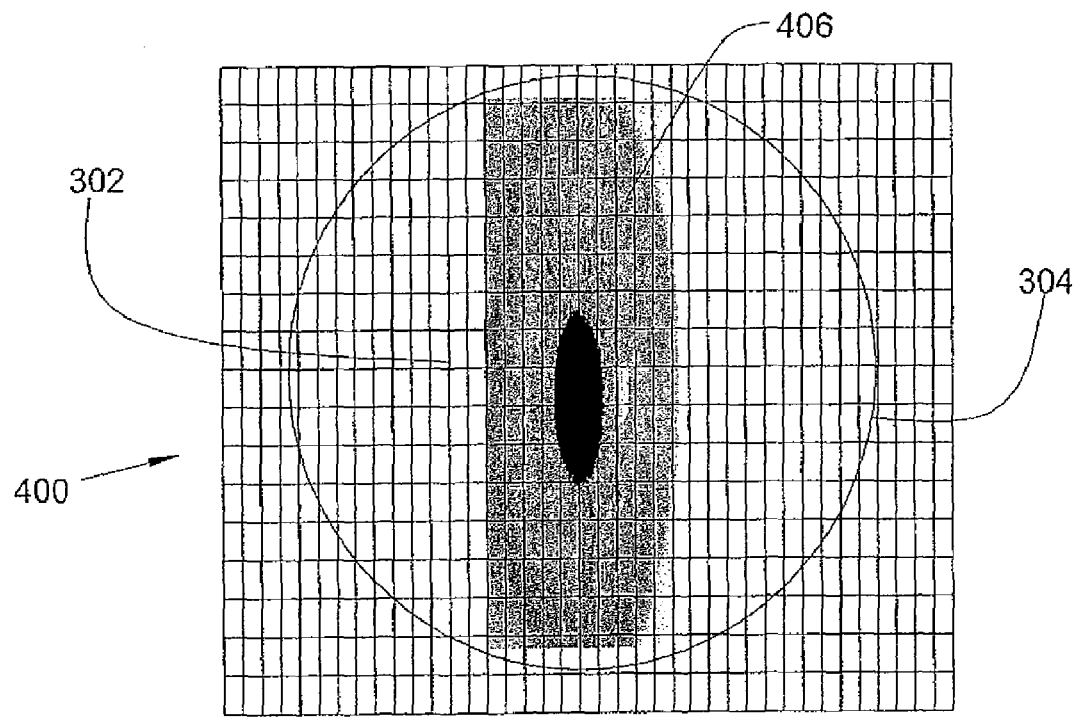
Figure 5:
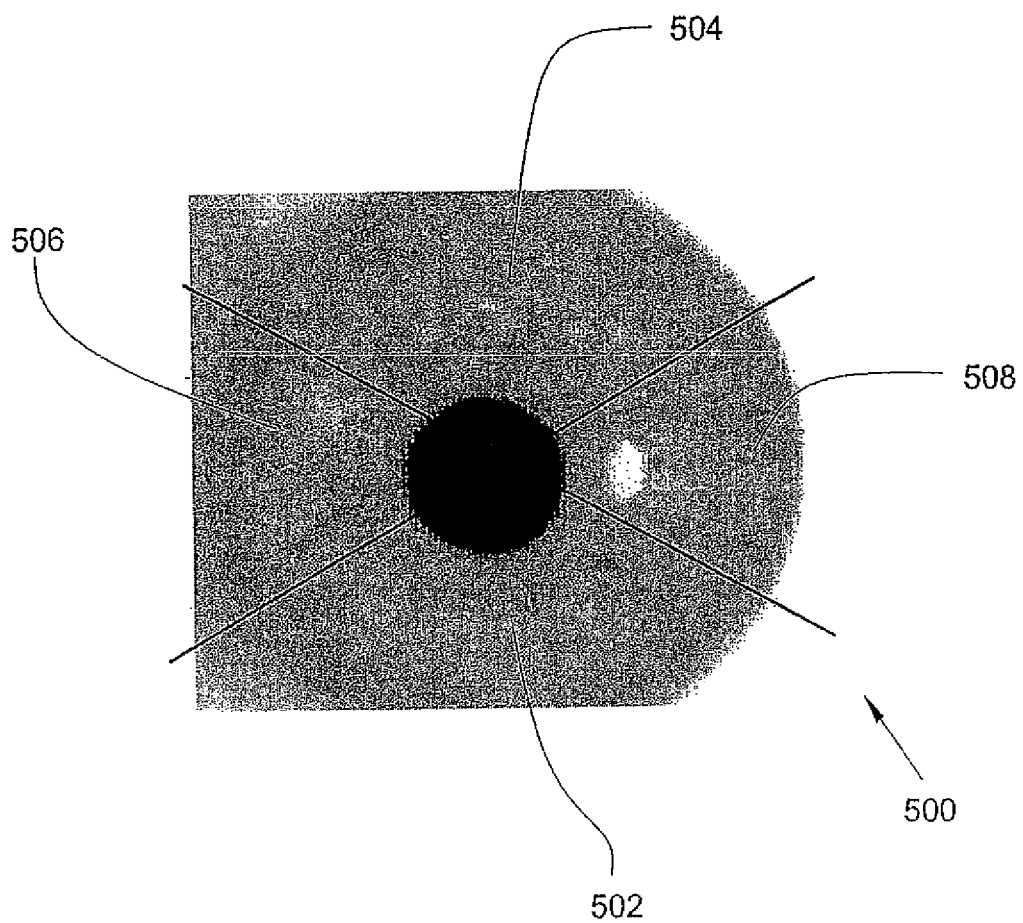

Signed and Sealed this
Twenty-second Day of January, 2013

David J. Kappos
*Director of the United States Patent and Trademark Office*